(12) United States Patent
Masuda et al.

(10) Patent No.: US 8,749,363 B2
(45) Date of Patent: Jun. 10, 2014

(54) UNIVERSAL ACCESSORY FOR VIEWING A SMARTPHONE DISPLAY IN AN AUTOMOBILE

(75) Inventors: Takefumi Masuda, Tokyo (JP); Tetsuya Okuda, Redwood City, CA (US); Chandrashekar Subba, Redwood City, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 315 days.

(21) Appl. No.: 13/247,841

(22) Filed: Sep. 28, 2011

(65) Prior Publication Data

US 2013/0076496 A1    Mar. 28, 2013

(51) Int. Cl.
    *G08B 21/00*      (2006.01)
(52) U.S. Cl.
    USPC ........ 340/425.5; 340/999; 224/400; 224/483; 361/679.01; 455/569.2
(58) Field of Classification Search
    USPC ............... 340/425.5, 999; 224/483, 276, 400; 361/600, 679.01; 455/569.1, 569.2; 701/1

See application file for complete search history.

(56) References Cited

U.S. PATENT DOCUMENTS

| | | | |
|---|---|---|---|
| 6,056,175 A * | 5/2000 | Mieglitz et al. | 224/282 |
| 7,587,275 B2 * | 9/2009 | Chen et al. | 701/438 |
| 2003/0013500 A1 * | 1/2003 | Dunoff et al. | 455/569 |
| 2012/0050012 A1 * | 3/2012 | Alsina et al. | 340/10.1 |

* cited by examiner

*Primary Examiner* — Jeffery Hofsass
(74) *Attorney, Agent, or Firm* — Sreenivas Vedantam; Moore & Van Allen PLLC

(57) ABSTRACT

The invention is directed to systems, methods and computer program products for presenting visual information in an automobile. An exemplary system includes a receiving station that receives a mobile device; and a display unit that presents, to a driver or a passenger in the automobile, visual information in response to one or more instructions input to the mobile device. The display unit of the system is separate from the mobile device's display. In some embodiments, the display is a mirror, while, in other embodiments, the display is an electronic display. In some embodiments, the receiving station has the ability to receive mobile devices of a plurality of types.

18 Claims, 9 Drawing Sheets

UNIVERSAL ACCESSORY FOR VIEWING A SMARTPHONE DISPLAY IN AN AUTOMOBILE

BACKGROUND

Each year, there is an increase in the number of automobile accidents caused by drivers who use mobile communication devices while driving. This increase can be attributed to the increase in functionality and versatility of mobile communication devices. In order to address this hazard, there is a need to provide a separate display unit in an automobile that can be placed near a driver's line of sight in order to prevent drivers from alternating between looking ahead at the road on which they are driving and looking at the display of a mobile communication device that is usually in the driver's hands or on the driver's lap. Additionally, with each member of a household now owning a mobile device that is of a different type (e.g., different shape, size, model, manufactured by a different manufacturer, etc.), there is a need for a universal receiving station in an automobile that receives any type of mobile communication device, and allows a driver or passenger in the vehicle to view the mobile communication device's display on the separate display unit.

BRIEF SUMMARY

Embodiments of the invention are directed to systems, methods and computer program products for presenting visual information in an automobile. In some embodiments, an exemplary system includes a receiving station that receives a mobile communication device, and a display unit that presents, to a driver or a passenger in the automobile, visual information in response to one or more instructions input to the mobile communication device, where the display unit is separate from the mobile communication device's display. In some embodiments, the receiving station charges a rechargeable power source located in the mobile communication device.

In some embodiments, the display unit is a convex mirror, where the mobile communication device's display presents visual information in response to the one or more input instructions received at the mobile communication device, and where the display unit and the receiving station are positioned such that the display unit reflects at least a portion of the mobile communication device's display.

In some embodiments the receiving station is a universal receiving station that has the ability to receive mobile communication devices of a plurality of types (e.g., models, shapes, sizes, manufactured by a plurality of manufacturers, etc.). Therefore, the receiving station is not limited to receiving a mobile device associated with a single type.

In some embodiments, the receiving station is configured to automatically determine a model and manufacturer associated with the mobile communication device, and the receiving station automatically configures itself to receive output information from the mobile communication device in response to the one or more input instructions received at the mobile communication device.

In some embodiments, the display unit is an electronic display. In some embodiments, the display unit has audio output capability such that the display unit, instead of the mobile communication device, outputs audio signals in response to one or more triggering events (e.g., receiving a call, receiving a message, playing a song using an audio application, generating an error message, etc.) detected at the mobile communication device.

In some embodiments, the receiving station receives output information from the mobile communication device in response to the one or more input instructions received at the mobile communication device, where the display unit is separate from the receiving station and receives one or more communication signals from the receiving station, and where the one or more communication signals carry the output information to be presented on the display unit.

In some embodiments, the receiving station is electronically connected to the mobile communication device. Alternatively or additionally, in some embodiments, the receiving station is magnetically connected to the mobile communication device. Alternatively or additionally, in some embodiments, the receiving station is connected to the display unit via a hinge, where the hinge permits rotation of the display unit with respect to the receiving station such that the display unit can fold over and rest on the receiving station.

In some embodiments, the receiving station is positioned substantially horizontally with respect to the plane of the automobile, and the display unit is positioned substantially vertically with respect to the plane of the automobile.

In some embodiments, the display unit is secured to the automobile such that the display unit allows a driver or a passenger in the automobile to view the visual information presented on the display unit while the automobile is in motion.

In some embodiments, the visual information is not presented on the mobile communication device's display when the visual information is presented on the display unit.

In some embodiments, an exemplary method is a method for presenting visual information in an automobile. The exemplary method includes receiving a mobile communication device at a receiving station in an automobile, positioning a display unit in the automobile such that information presented on the display unit is viewable by a driver or a passenger in the automobile, receiving one or more input instructions at the mobile communication device, and presenting visual information on the display unit in response to the one or more input instructions received at the mobile communication device, where the display unit is separate from the mobile communication device's display.

In some embodiments, the method further comprises charging a rechargeable power source located in the mobile communication device when the mobile communication device is received at the receiving station.

In some embodiments of the method, the display unit is a mirror, the mobile communication device's display presents visual information in response to the one or more input instructions received at the mobile communication device, and the presenting further includes reflecting, by the display unit, at least a portion of the mobile communication device's display.

In some embodiments of the method, the display unit is an electronic display, and the method further comprises: receiving, at the receiving station, output information from the mobile communication device in response to the one or more input instructions received at the mobile communication device, and sending, to the display unit from the receiving station, one or more communication signals carrying the output information to be presented on the display unit.

In some embodiments, an exemplary computer program product is a computer program product for presenting visual information in an automobile. The computer program product includes a non-transitory medium comprising a set of codes that cause a computer to: receive output information at a receiving station from the mobile communication device in response to one or more input instructions received at the mobile communication device, and send, to a display unit from the receiving station, one or more communication signals, where the one or more communication signals carry the output information to be presented on the display unit, where the display unit is separate from the mobile device's display.

BRIEF DESCRIPTION OF THE DRAWINGS

Figure 1:
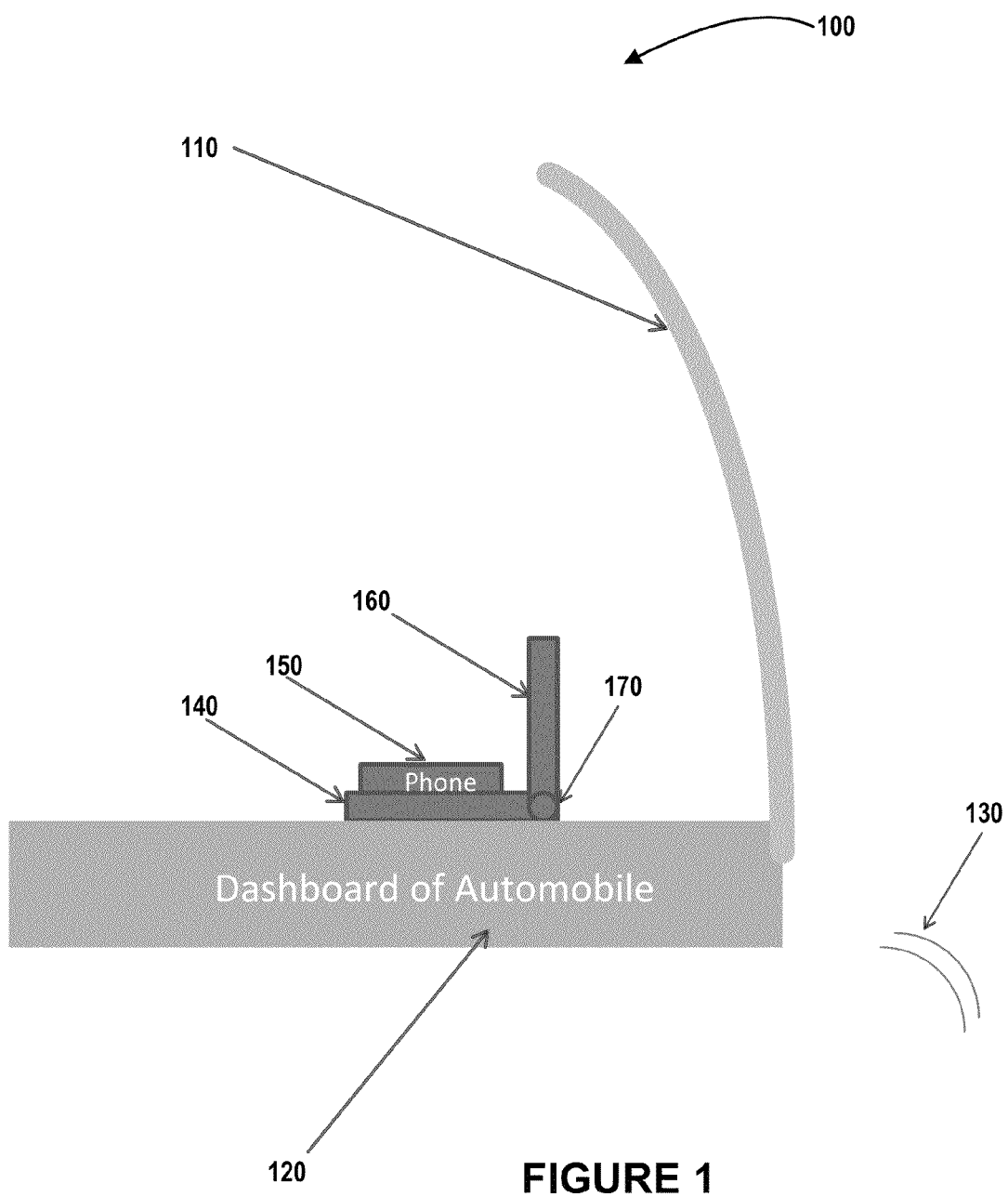
Figure 2:
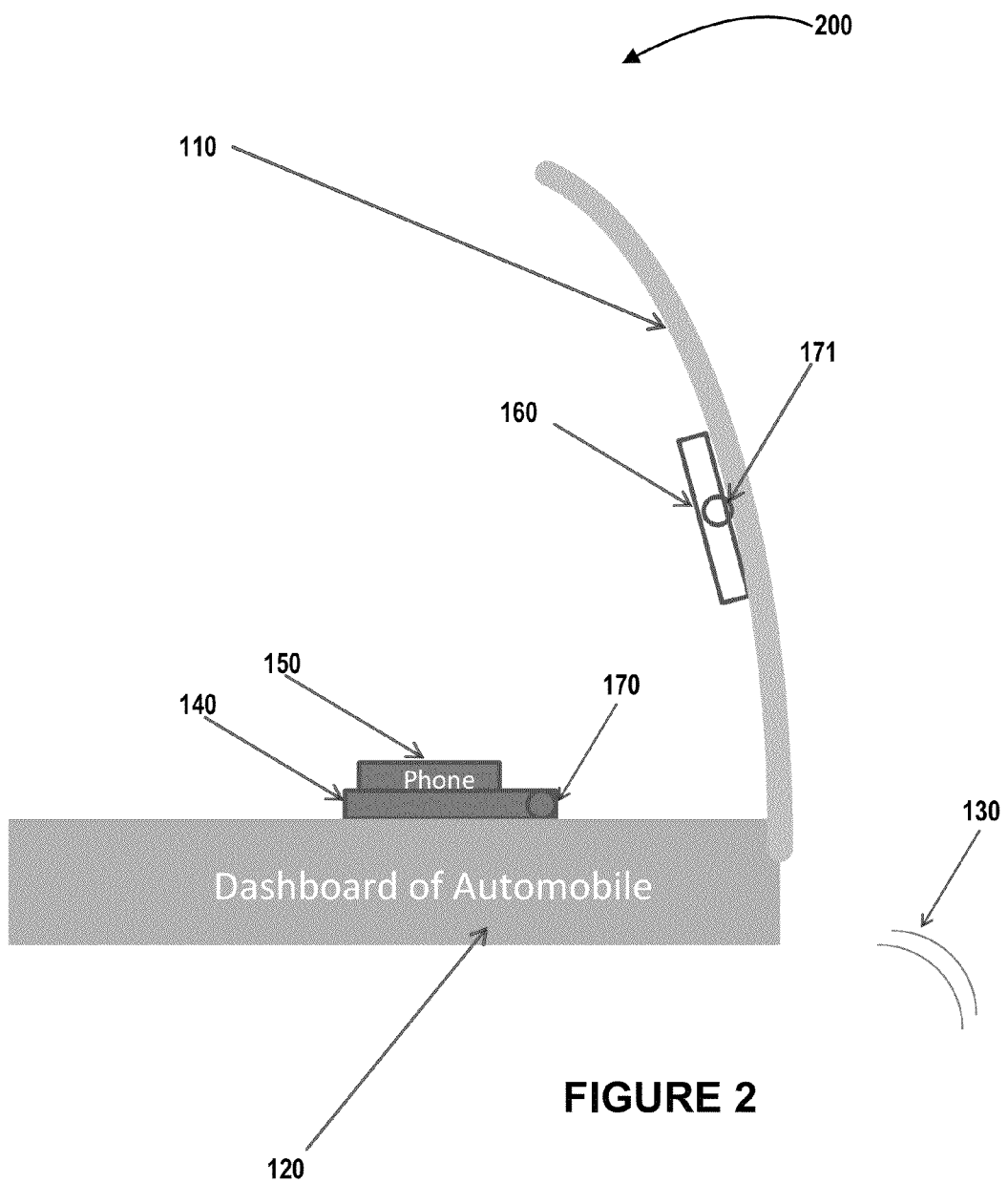
Figure 3:
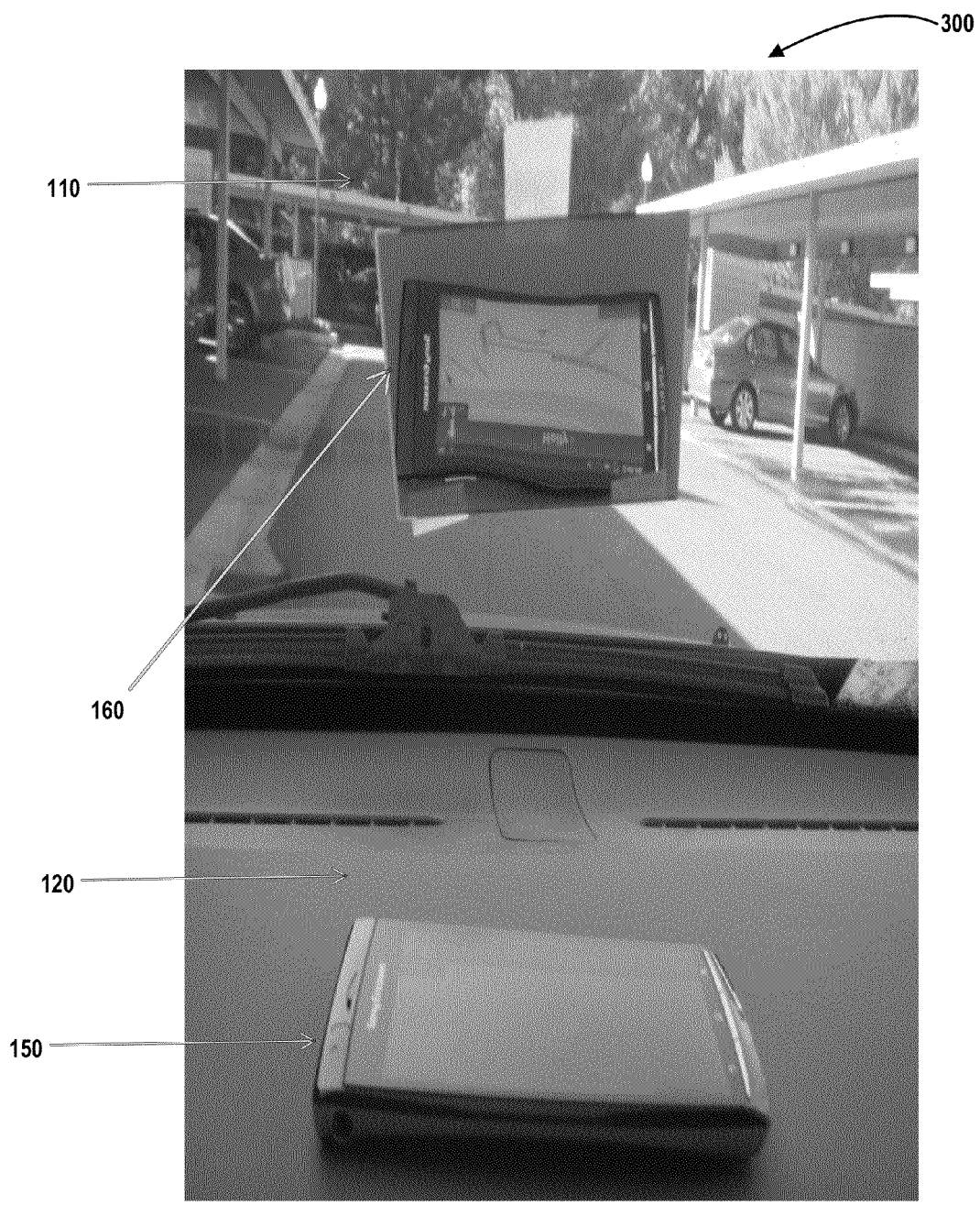
Figure 4:
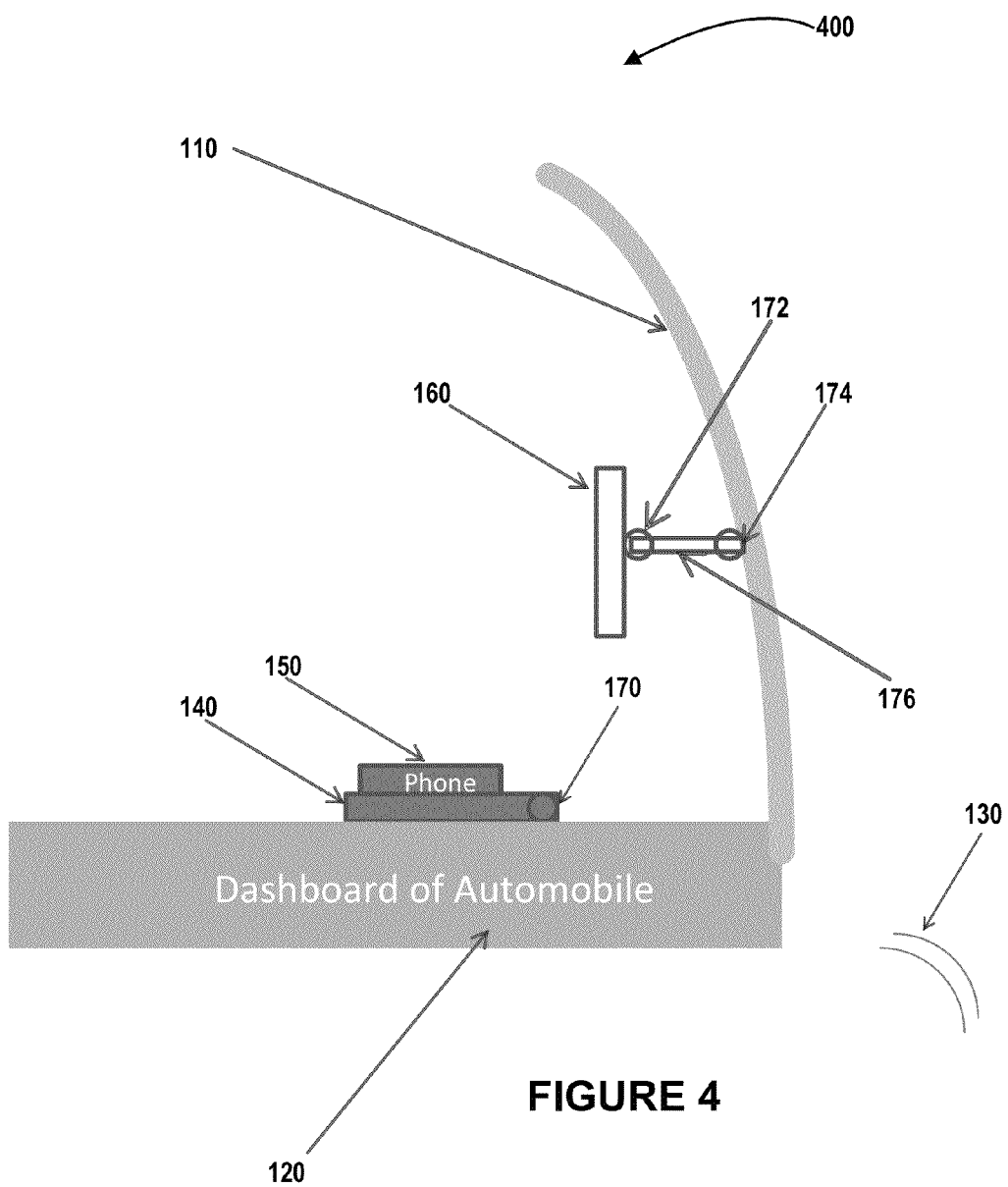
Figure 5:
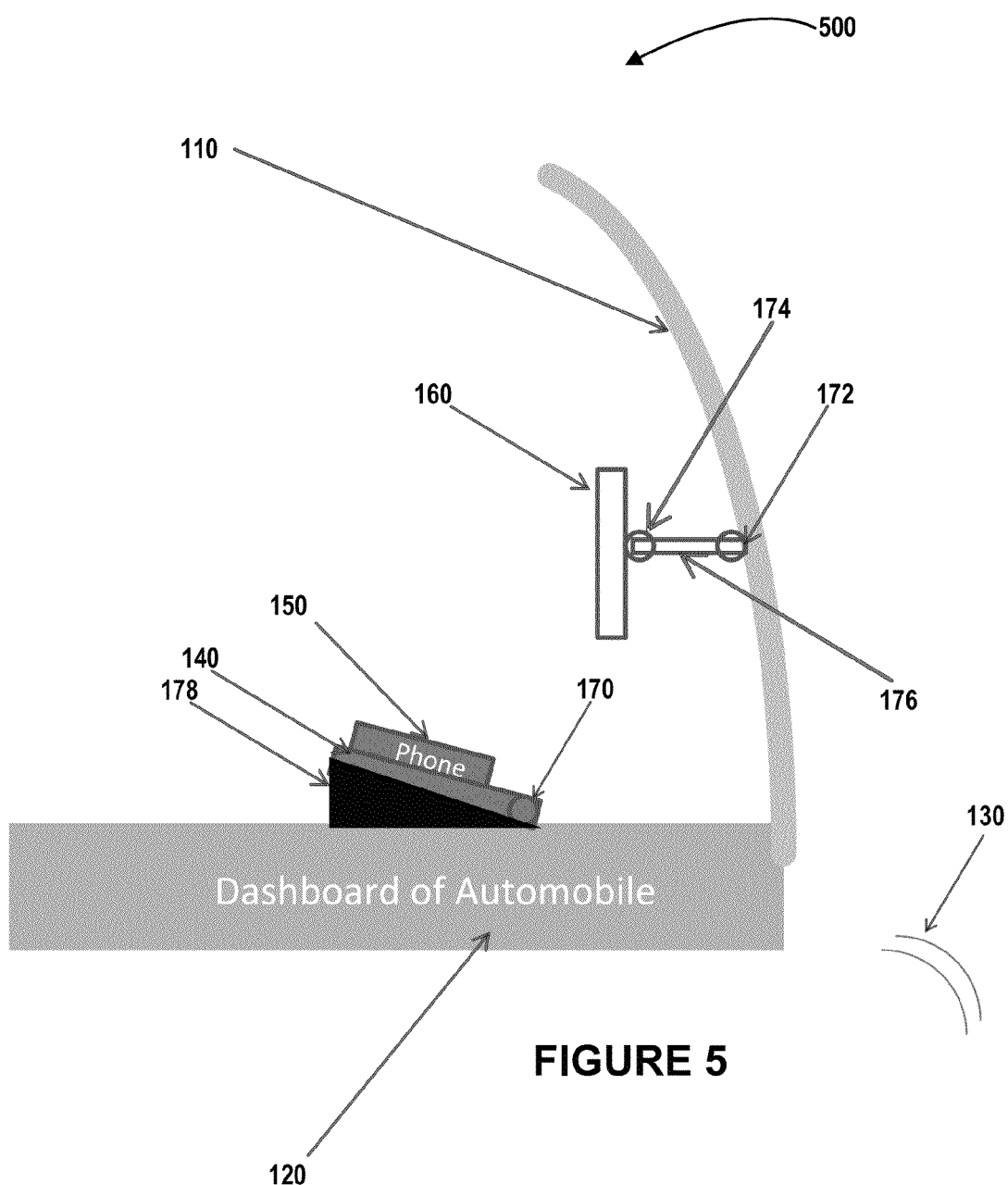
Figure 6:
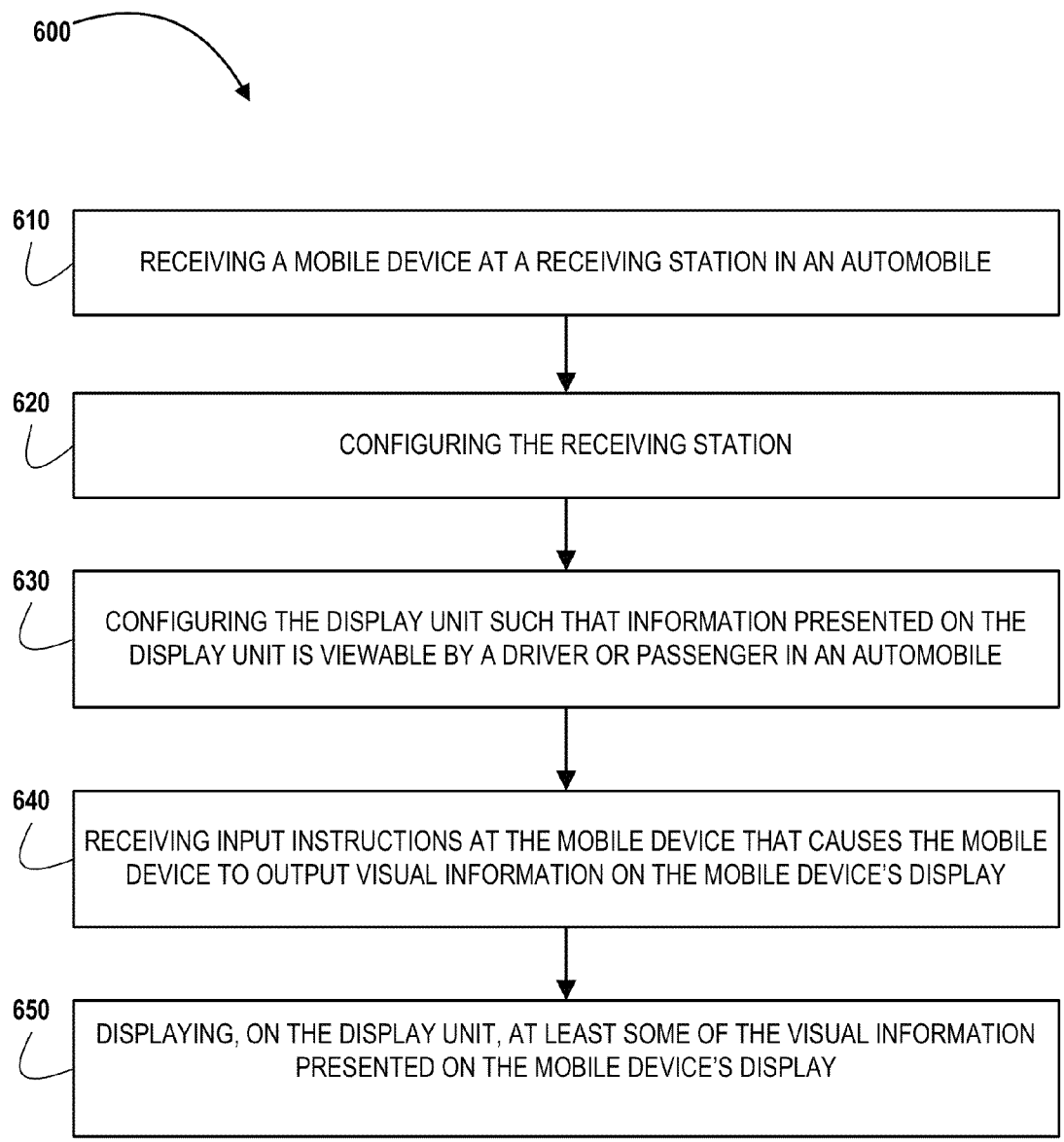
Figure 7:
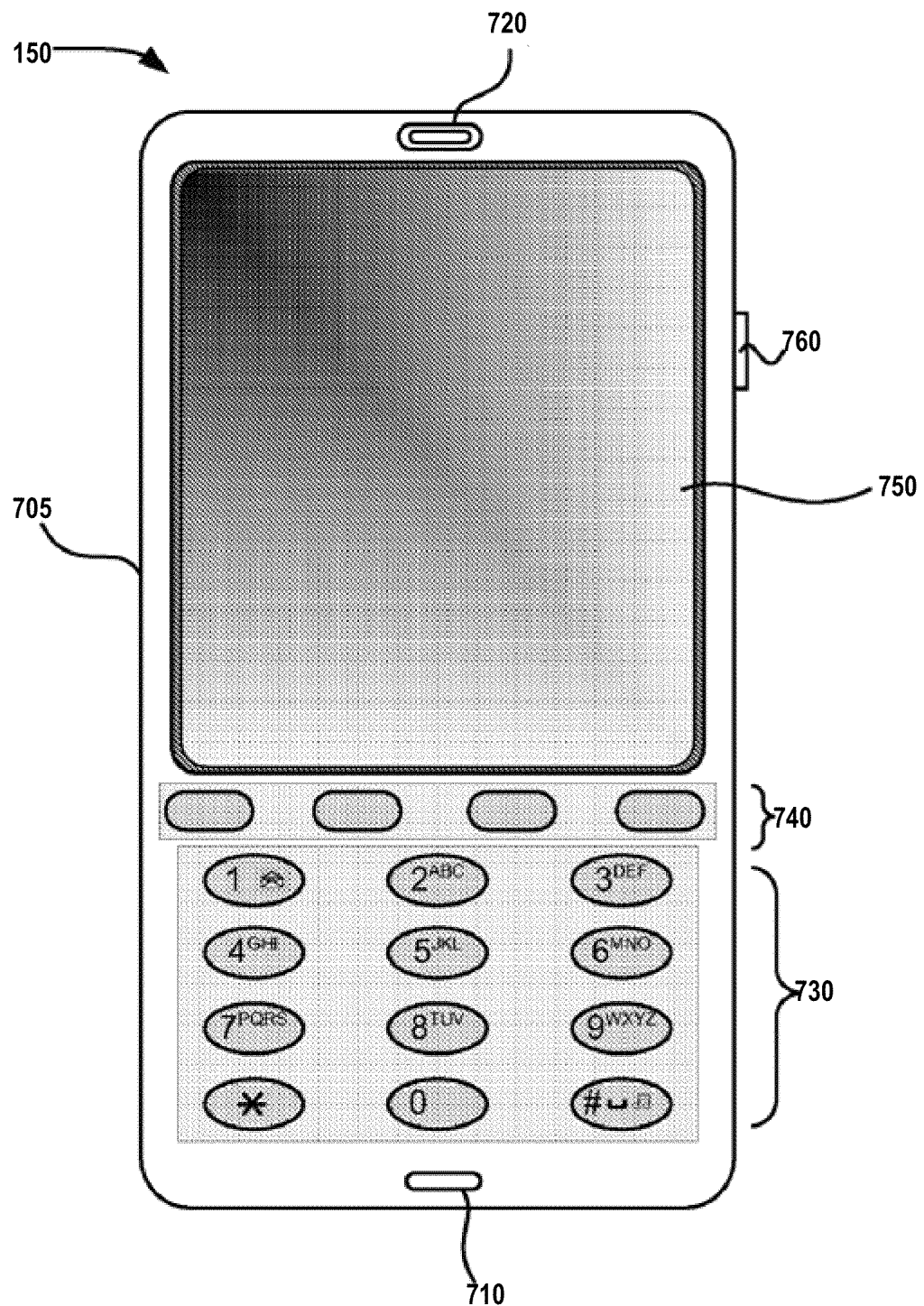
Figure 8:
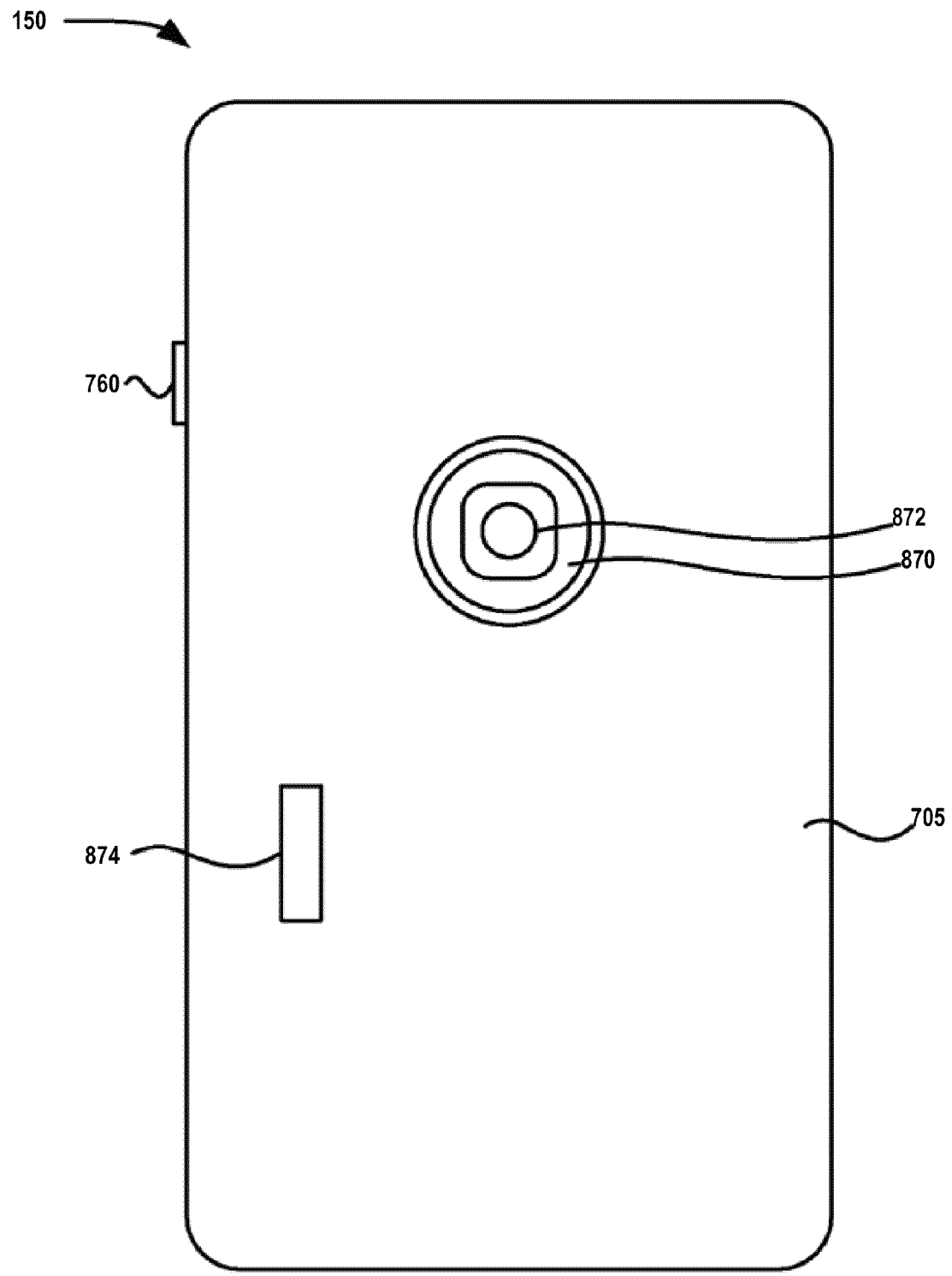
Figure 9:
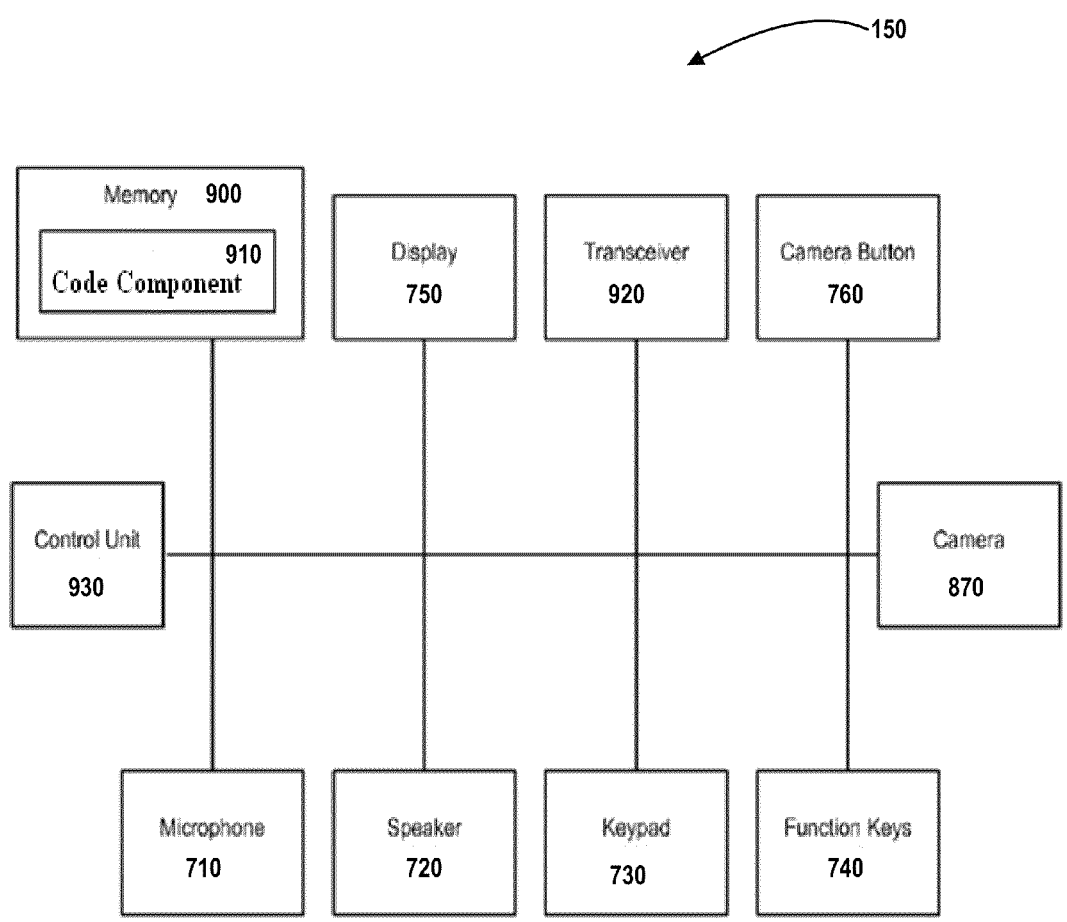

Having thus described embodiments of the invention in general terms, reference will now be made to the accompanying drawings, where:

FIG. 1 is a block diagram of an embodiment of a system for presenting visual information in an automobile;

FIG. 2 is another block diagram of another embodiment of a system for presenting visual information in an automobile;

FIG. 3 is a picture of an embodiment of a system for presenting visual information in an automobile;

FIG. 4 is another block diagram of another embodiment of a system for presenting visual information in an automobile;

FIG. 5 is another block diagram of another embodiment of a system for presenting visual information in an automobile;

FIG. 6 is a flowchart illustrating a general process flow for presenting visual information in an automobile, in accordance with embodiments of the present invention;

FIG. 7 is an exemplary mobile communication device, in accordance with embodiments of the present invention;

FIG. 8 is a diagram illustrating a rear view of exemplary external components of the mobile device depicted in FIG. 7, in accordance with embodiments of the present invention; and FIG. 9 is a diagram illustrating exemplary internal components of the mobile device depicted in FIG. 7, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for presenting visual information in an automobile. An exemplary system includes a receiving station that receives a mobile device, and a display unit that presents, to a driver or a passenger in the automobile, visual information in response to one or more instructions input to the mobile device. The display unit of the system is separate from the mobile device's display. In some embodiments, the display unit is a mirror, while, in other embodiments, the display unit is an electronic display. As used herein, a mobile device may refer to a mobile communication device that can be used for telecommunication purposes. In some embodiments, the mobile device may also have global positioning system (GPS) capability and may be used as a GPS device. As used herein, a "receiving station" may also be referred to as a "receiving accessory." In some embodiments, the receiving station may send and receive (wired or wireless) electronic signals to and from other electronic devices or sources, while in other embodiments, the receiving station may be a non-electronic station that does not have the capability to send and receive electronic signals to and from other electronic devices or sources.

In some embodiments, the receiving station has the ability to receive mobile devices of a plurality of types (e.g., a plurality of models, a plurality of shapes, a plurality of sizes, a plurality of form factors (e.g., dimensions), manufactured by a plurality of manufacturers, etc.). The receiving station is not limited to receiving a mobile device of a single type. As used herein, the term "type" may refer to a shape of a mobile device, a size of the mobile device, a look or feel or a mobile device, a model of a mobile device, a manufacturer or distributor associated with a mobile device, etc. Other than a mobile communication device, the receiving station may be configured to receive a music player, a computing notebook or tablet, a mobile television device, a global positioning system (GPS) device, etc. In some embodiments, after a mobile device is received is received at a receiving station, the mobile device also needs to be secured to the receiving station. Various securing mechanisms are described below. In some embodiments, the mobile devices do not themselves have to be adapted or configured to be able to be received at the receiving station; therefore, the receiving station may receive any pre-existing or future mobile devices. In some embodiments, the receiving station may be configured to receive any type of electronic device, where the electronic device may or may not include a display.

Furthermore, the receiving station also functions as a charging station such that the receiving station charges a rechargeable power source located in the mobile device when the mobile device is received at the receiving station. In some embodiments, the receiving station activates its charging function when the receiving station determines that the power level in the rechargeable power source of the mobile device has fallen below a predetermined threshold level. This predetermined threshold level may be set by a user of the mobile device. For example, the mobile device may prompt the user to select an option via the user interface of the mobile device to set the predetermined threshold level for triggering a recharge of the rechargeable power source. This predetermined threshold level is read or received by the charging station when the mobile device is received at the receiving station. Additionally, in some embodiments, when the mobile device is received at the receiving station, the mobile device uses the power from the receiving station as its power source, and not the power from the rechargeable power source located in the mobile device, in order to execute the mobile device's various functions.

Referring now to FIG. 1, an exemplary system 100 is provided for presenting visual information in an automobile, in accordance with embodiments of the present invention. The system 100 includes a receiving station 140 and a display unit 160. FIG. 1 also illustrates the dashboard 120, the windshield 110, and the hood 130 of the automobile. As indicated in FIG. 1, the mobile device 150 is received at (or mounted upon) the receiving station 140 and is secured to the receiving station 140 using one or more securing mechanisms. The receiving station 140 may include a flat surface on which the mobile device 150 is placed. Horizontal mounting of a mobile device onto a receiving station 140 allows the receiving station 140 to receive different sizes and shapes of mobile devices. A mobile device needs to be secured to the receiving station so that the mobile device does not shift position when the automobile is in motion.

In some embodiments, the mobile device 150 may be secured to the receiving station 140 using a magnetic securing mechanism. Therefore, a magnet that is attached to the mobile device 150 binds with a magnet attached to the receiving station 140, consequently causing the mobile device 150 to be secured to the receiving station 140. As a further example, the mobile device 150 may be secured to the receiving station 140 using an electronic securing mechanism. For example, an electronic wire (e.g., a universal serial bus (USB) wire) may be connected from the mobile device 150 to the receiving station 140. Additionally or alternatively, an electronic male or female connector on the receiving station 140 may be connected to an electronic female or male connector, respectively, on the mobile device 150. As a further example, the mobile device 150 may be secured to the receiving station 140 using a mechanical securing mechanism (e.g., one or more fasteners). As used herein, a fastener is a hardware device that affixes or joins two or more objects together. Examples of fasteners include clamps, clasps, clips, clutches, grommets, nails, pegs, staples, straps, tacks, zippers, buckles, flanges, pins, retaining rings, snaps, bands, stitches, tacks, zippers, toggles, screw anchors, adhesive materials, etc.

In some embodiments, one or more of the above-described securing mechanisms (magnetic, electronic, mechanical, etc.) may be used in combination with each other. For example, in some embodiments, the mobile device may be electronically connected to the receiving station while also being mechanically secured to the receiving station using one or more fasteners.

Additionally or alternatively, the receiving station 140 may include a receiving cavity or pocket that receives the mobile device 150. In such an embodiment, the mobile device 150 may be surrounded by the body of the receiving station 140 on at least two sides of the mobile device 150. In such an embodiment, the surface of the mobile device 150 may not protrude above the sides of the receiving station 140. In such an embodiment, the receiving station 140 may include a transparent screen (e.g., a glass screen) through which the display of the mobile device 150 is visible.

In some embodiments, the receiving station 140 may be built into the dashboard 120. In some embodiments where the receiving station 140 is built into the dashboard 120, there may be multiple receiving station 140 located on the dashboard 120 (or the entire exposed area of the dashboard 120 may serve as a receiving station 140). In embodiments where the receiving station 140 is built into the dashboard 120, there may be no noticeable projection of the receiving station 140 above the surface of the dashboard 120. In other embodiments, the receiving station 140 may be removably secured to the dashboard 120 using one of the securing mechanisms described herein.

In some embodiments where the mobile device 150 is electronically or magnetically secured or connected to the receiving station 140, the receiving station 140 may receive output information from the mobile device 150 in response to one or more input instructions received at the mobile device 150. As used herein, input instructions may be input by a user of the mobile device 150 but do not necessarily have to be input by a user of the mobile device 150. The input instructions may be received from a base station, another mobile device, the automobile in which the receiving station 140 is located, the receiving station 140, the display unit 160, a remote control device associated with the mobile device 150, etc. The input instructions may be of any form (e.g., voice input, signal input, touch input, etc.). In still other embodiments, the input instructions may be self-initiated by the mobile device 150 itself.

In some embodiments, when the mobile device 150 is received at the receiving station 140, the receiving station 140 may determine a model and manufacturer associated with the mobile device 150. In response to determining the model and manufacturer associated with the mobile device 150, the receiving station 140 may configure itself to receive output information from the mobile device 150. The receiving station 140 may forward a message to the mobile device 150 and/or the display unit 160 to indicate to the user of the system (or to indicate to the mobile device 150 and/or display unit 160) that the receiving station 140 has identified the mobile device 150 and will be able to both receive output information from the mobile device 150 and forward the output information to the display unit 160.

In some embodiments, when the mobile device 150 includes a rechargeable power source, the receiving station 140 charges the rechargeable power source located in the mobile device 150 when the mobile device 150 is received into the receiving station 140. In some embodiments, the receiving station 140 may also be used to transfer power from the rechargeable power source located in the mobile device 150 to a rechargeable power source located in the receiving station 140 or in the automobile. In some embodiments, the receiving station 140 charges the rechargeable power source only when the automobile's engine is running or when the automobile is in motion.

As explained previously, the receiving station 140 may be secured to the dashboard 120 of the automobile using one or more of the same securing mechanisms by which the mobile device 150 is secured to the receiving station 140. In other embodiments, the receiving station 140 may be removably secured to any other substantially horizontal surface other than the dashboard 120 in the interior portion (e.g., the center console) of an automobile. In still other embodiments, the receiving station 140 may be removably secured to other parts of the interior portion of an automobile (e.g., a front or back seat, a door panel, the steering wheel, etc.).

In some embodiments, the mobile device 150 may not actually be in physical contact with the receiving station 140 in an automobile. For example, the receiving station 140 may be built into the body of the automobile. In such embodiments, the mobile device 150 may still be able to communicate with the receiving station 140 using one or more of the various wireless communication mechanisms described herein. In such embodiments, the mobile device 150 may be directly secured to the dashboard 120 (or secured to another part in the interior portion of the automobile) using one or more of the several securing mechanisms (e.g., mechanical, magnetic, electronic, etc.) described herein. In such embodiments, where the receiving station 140 provides charging capability, the receiving station 140 may still be able to charge a rechargeable power source located in the mobile device 150 using a wireless charging mechanism.

In some embodiments, the display unit 160 includes a mirror (or is a mirror), while in other embodiments the display unit 160 is an electronic display. In some embodiments, the display unit 160 may be attached to the receiving station 140 using a hinge 170. As used herein, a hinge 170 or a hinged connection may include one or more mechanical fasteners that are used to attach the display unit 160 to the receiving station 140. Examples of fasteners have been provided earlier. The display unit 160 may be hingedly attached to the receiving station 140 along an edge (either length or breadth) of the display unit 160 and receiving station 140, or along several points along an edge of the display unit 160 and the receiving station 140, or at a single point along an edge of the display unit 160 and receiving station 140.

In embodiments where the display unit 160 is hingedly attached to the receiving station 140 along an edge of the display unit 160 and the receiving station 140, the display unit 160 may rotate about the hinged edge with respect to the receiving station 140. In some embodiments, the permissible angle of rotation (in a direction about a vertical axis of the automobile) may be three-hundred and sixty (360) degrees, while in other embodiments, the permissible angle of rotation may be less than 360 degrees. The rotatable display unit 160 allows a driver or passenger to tilt the display unit 160 forwards and backwards with respect to the receiving station 140 that may be fixed in position so that the driver or passenger is able to view an image presented on the display unit 160 (the display may have a limited angular viewing range). In some embodiments, the hinge 170 may permit the display unit 160 to fold over and rest on the receiving station 140. This may allow a user to easily store and put away the receiving station 140 and display unit 160 when the system is not being used.

In some embodiments (e.g., embodiments where the display unit 160 is hinged to the receiving station 140 at a single point along an edge of the display unit 160, embodiments where the display unit 160 is hinged to the receiving station 140 at a contiguous range of points along an edge of the display unit 160 but not extending along the entire edge of the display unit 160, etc.), the display unit 160 may be rotated (e.g., rotated three hundred and sixty degrees) with respect to the receiving station 140, which may be fixed, in a direction about a horizontal axis of the automobile or a horizontal axis of the receiving station 140. This angle of rotation enables a driver or passenger to tilt the display towards his or her side in order to have a better view of the image on the display. This is useful when the display unit 160 is an electronic display (e.g., LCD display) with a limited angular viewing range.

In some embodiments, the display unit 160 is positioned substantially vertically with respect to the plane of the automobile. For instance, when the display unit 160 is hinged to the receiving station 140, the display unit 160 is situated on the dashboard 120 and is substantially perpendicular with respect to the dashboard 120. In other embodiments where the display unit 160 is separate from the receiving station 140, the display unit 160 may be positioned on the windshield 110 in a substantially vertical position so that the driver or passenger may view the visual information presented on the display unit 160.

In some embodiments, the mobile device's 150 display presents visual information in response to the one or more input instructions received at the mobile device 150. As used herein, input instructions may be input by a user of the mobile device 150 but do not necessarily have to be input by a user of the mobile device 150. The input instructions may be received from a base station, another mobile device, the automobile in which the receiving station 140 is located, the receiving station 140, the display unit 160, a remote control device associated with the mobile device 150, etc. The input instructions may be of any form (e.g., voice input, signal input, touch input, etc.). In still other embodiments, the input instructions may be self-initiated by the mobile device 150 itself. In some embodiments, the display unit 160 is a flat mirror. In other embodiments, the display unit 160 is a convex mirror such that the image displayed on the mirror is much bigger than the mobile device's 150 display. The display unit 160 and the receiving station 140 are positioned such that the display unit 160 reflects at least a portion of the mobile device's 150 display.

In some embodiments, the display unit 160 may reflect an image of the whole mobile device 150 and the environment where the mobile device 150 is placed, i.e., the receiving station 140 and dashboard 120 area surrounding the receiving station 140. In other embodiments, the display unit 160 may be configured to reflect just an image of the mobile device's 150 display (or a portion of the mobile device 150 display).

In some embodiments, a user may adjust the properties of the display unit 160 such that the display unit 160 zooms into and out of various portions of the mobile device's 150 display. The user may adjust the properties using one or more physical or electronic controls (e.g., physical or digital buttons or selection options) for the display unit 160. In some embodiments, these controls may be located on the display unit 160 itself. In other embodiments, these controls may be located on the dashboard 120 or the central console of the automobile and may allow a driver or passenger to zoom into and out of various portions of the mobile device's 150 display and navigate the mobile device's 150 display. In still other embodiments, these controls may be located on a remote control device that can be used to control the display unit 160 (and control the mobile device 150, the receiving station 140, etc.). In other embodiments, the user may adjust the properties of the image presented on the display unit 160 using voice controls such that the display unit 160 interprets the user's voice and performs one or more operations in response to the user's voice instructions. The controls may be used to execute one or more functions, including changing the focus of the display unit 160 from one part of the mobile device's 150 display to another part of the mobile device's 150 display, zooming into or out the part of the mobile device 150 display that is currently being focused upon, etc. Additionally, in some embodiments, the remote control device may provide a graphical indicator (similar to a mouse pointer) that may be used to navigate the visual information or image presented on the display unit 160. In some embodiments, this remote control device may be integrated into the steering wheel.

In other embodiments, the display unit 160 is an electronic display. In such embodiments, the display unit 160 may be a liquid crystal display (LCD). In another implementation, the display unit 160 may be any one of other display technologies, such as a plasma display panel (PDP), a field emission display (FED), a thin film transistor (TFT) display, etc. The display unit 160 may be utilized to display, for example, text, image, and/or video information.

In some embodiments, the display unit 160 receives one or more communication signals from the receiving station 140, where the one or more communication signals carry the output information (e.g., output visual information) to be presented on the display unit 160. The receiving station 140 receives the output information from the mobile device 150 in response to one or more input instructions received at the mobile device 150. The receiving station 140 then forwards the output information to the display unit 160. In embodiments where the receiving station 140 is connected to the display unit 160 via an electronic contact accessory (e.g., a hinge that also serves as an electronic connection between the display unit 160 and the receiving station 140, a wire, etc.), the output information is forwarded to the display unit 160 from the receiving station 140 via the electronic contact accessory. In embodiments where the receiving station 140 is not connected to the display unit 160 via an electronic contact accessory, the receiving station 140 forwards the output information to the display unit 160 via a wireless mechanism (e.g., a short-range wireless mechanism). Exemplary short-range wireless mechanisms include near-field communication (NFC), infra-red transmission (IR), Bluetooth, short-range radio frequency (RF) signals, IEEE 802.11x, WiFi, wireless universal serial bus (USB), HomeRF, IrDA-based (Infrared Data Association) transmission, etc.

In some embodiments, the display unit 160 receives output information directly from the mobile device 150, and not via the receiving station 140, in response to the one or more input instructions received at the mobile device 150. In embodiments where the mobile device 150 is connected to the display unit 160 via an electronic contact accessory (e.g., a hinge that also serves as an electronic connection between the display unit 160 and the receiving station 140, a wire, etc.), the output information is forwarded to the display unit 160 from the mobile device 150 via the electronic contact accessory. In embodiments where the mobile device 150 is not connected to the display unit 160 via an electronic contact accessory, the mobile device 150 forwards the output information to the display unit 160 via a wireless mechanism (e.g., a short-range wireless mechanism). Exemplary short-range wireless mechanisms include near-field communication (NFC), infrared transmission (IR), Bluetooth, short-range radio frequency (RF) signals, IEEE 802.11x, WiFi, wireless universal serial bus (USB), HomeRF, IrDA, etc.

In some embodiments where the display unit 160 is an electronic display, the display unit 160 has audio output capability such that the display unit 160, instead of the mobile device 150, outputs audio signals in response to one or more triggering events (e.g., receiving a call, receiving a message, playing a song using an audio application, generating an error message, etc.) detected at the mobile device 150. In other embodiments, both the display unit 160 and the mobile device 150 may output audio signals in response to one or more triggering events detected at the mobile device 150. The audio output information may be forwarded (e.g., via an electronic contact mechanism or a wireless mechanism) to the display unit 160 by either the receiving station 140 or the mobile device 150 along with the visual output information as indicated above. In embodiments where the output information is forwarded from the mobile device 150 to the receiving station 140, the output information is subsequently communicated from the receiving station 140 to the display unit 160. In embodiments where the output information is not forwarded from the mobile device 150 to the receiving station 140 (or in embodiments where the mobile device 150, after being received at the receiving station 140, determines that the receiving station 140 does not have the capability to receive output information from the mobile device 150 or the capability to communicate output information to the display unit 160), the output information is communicated directly from the mobile device 150 to the display unit 160.

As explained herein, a remote control device (not shown in the Figures) may be provided. In some embodiments, the remote control device may even offer hands-free control to control various options associated with the display unit 160, the receiving station 140, and even the mobile device 150. The remote control device may allow a driver or passenger to navigate an image displayed on the display unit 160 or otherwise configure the image displayed on the display unit 160 (e.g., zoom into and out of various portions of the image displayed on the display unit 160). In some embodiments, the remote control device may even be used as an input device (e.g., a typing device, a pointer device that provides functionality similar to a mouse pointer, etc.). In an exemplary embodiment, any typing instructions or user interface selection instructions from the remote control device may be communicated to the mobile device 150, and the output from the mobile device 150 appears on the display unit 160.

Referring now to FIG. 2, a block diagram 200 is presented for a system for presenting visual information in an automobile, in accordance with embodiments of the present invention. In the embodiment presented in FIG. 2, the display unit 160 is separate from the receiving station 140. The display unit 160 in FIG. 2 is removably attached to the windshield 110 of the automobile using one or more securing mechanisms. As used herein, a "securing mechanism" may also be referred to as an "attaching mechanism." For example, in some embodiments, the invention uses a sticky ball 171. The sticky ball 171 is received into a spherical cavity in the display unit 160 and the exposed surface area of the sticky ball 171 is attachable to the windshield 110 using adhesive material that is present on the sticky ball 171. In the embodiment presented in FIG. 2, the display unit 160 may be in physical contact with the windshield 110 at one or more points along the surface area of the display unit 160. In other embodiments, other mechanical securing mechanisms (e.g., one or more mechanical fasteners) listed herein may be used in place of the sticky ball 171 to attach the display unit 160 to the windshield 110. For example, one or more fasteners listed above may be used to attach the display unit 160 to the windshield 110.

In other embodiments, the securing mechanism may be a magnetic securing mechanism. A magnet may be removably attached (e.g., using an adhesive) to the windshield 110. A magnet may also be removably attached (e.g., using an adhesive) to the display unit 160. The attraction force between both magnets secures the display unit 160 to the windshield 110.

As explained previously, the display unit 160 may either be a mirror (e.g., a convex mirror) or an electronic display. In embodiments where the display is a mirror, the mirror may need to be positioned such that that a desired portion of the mobile device's 150 display is reflected by the mirror. The position of the mirror may be modified by the user. Alternatively, one or more physical or electronic controls (e.g., physical or digital buttons or selection options) may be provided for the display unit 160. In some embodiments, these controls may be provided on the display unit 160 itself. In other embodiments, these controls may be provided on the dashboard 120 or the central console of the automobile and may allow a driver or passenger to zoom into and out of (and/or scroll through) various portions of the image of the mobile device's 150 display presented on the display unit 160; and may allow the driver or passenger to navigate the image of the mobile device's 150 display presented on the display unit 160. In still other embodiments, these controls may be provided on a remote control device that can be used to control the display unit 160 (and/or the mobile device 150, receiving station 140, etc.). In other embodiments, the user may adjust the properties of image displayed on the display unit 160 using voice controls such that the display unit 160 interprets the user's voice and performs one or more operations in response to the user's voice instructions. The controls allow a user (e.g., driver or passenger) to change the focus of the image displayed on the display unit 160 from one part of the mobile device's 150 display to another part of the mobile device's 150 display. As a further example, the controls permit a user to zoom into or out of (and/or scroll through) the part of the mobile device 150 display that is currently being displayed on the display unit 160.

In embodiments where the display unit 160 is an electronic display, communication signals may be communicated from either the receiving station 140 to the display unit 160, and/or from the mobile device 150 to the display unit 160, when the mobile device 150 is received at the receiving station 140. These communication signals carry output information (e.g., visual output information) to be presented on the display unit 160. In some embodiments, the communication signals may alternatively or additionally carry audio output information to be output from the display unit 160, which is possible in embodiments where the display unit 160 includes audio output functionality. The communication signals may be generated in response to one or more input instructions received at the mobile device 150.

Referring now to FIG. 3, a picture is presented of an embodiment of a system for presenting visual information in an automobile. In the picture presented in FIG. 3, the display unit 160 is removably attached to the windshield 110 of the automobile, and the mobile device 150 is received at and secured to a receiving station 140 (not shown). In FIG. 3, the image of the mobile device 150 display presented on the display unit 160 (e.g., a mirror) is inverted or reversed with respect to a line of axis of the image. However, in other embodiments, when the mobile device 150 is received into the receiving station 140, the mobile device 150 determines that the mobile device 150 has been received at a receiving station 140 and automatically executes a code that outputs a mirror-viewable image on the mobile device's 150 display instead of a normal image. When this mirror-viewable image is reflected by the display unit 160, a user views a normal readable image, i.e., an image that is neither inverted nor reversed with respect to a line of axis of the image. Therefore, in such an embodiment, when a driver or passenger looks at the image on the mobile device 150 display, the image may appear to be inverted or reversed with respect to a line of axis of the image. In some embodiments, the mobile device 150 may execute a code such that both the image on the mobile device 150 display and the image reflected on the display unit 160 are viewable by a driver or passenger of the automobile. In such embodiments, neither the image presented on the mobile device 150 nor the image reflected by the display unit 160 is inverted or reversed with respect to a line of axis of the image.

Referring now to FIG. 4, a block diagram 400 is presented for a system for presenting visual information in an automobile, in accordance with embodiments of the present invention. The securing mechanism for securing the display unit 160 to the windshield 110 is different from the securing mechanism for securing the display unit 160 to the windshield 110 presented in FIG. 2. In the embodiment displayed in FIG. 4, the display unit 160 does not make any physical contact with the windshield 110. In the embodiment display in FIG. 4, the windshield 110 is attached to a pivotable rod 176 using a first fastener 172. The pivotable rod 176 is also attached to the display unit 160 using a second fastener 174. The first fastener 172 allows the pivotable rod 176 to be moved with respect to the windshield 110. When the pivotable rod 176 moves left and right (i.e., sideways) with respect to the first fastener 172, the display unit 160 moves either closer to the driver or closer to the passenger on the front seat. The second fastener 174 allows the display unit 160 to be moved with respect to the pivotable rod 176. Therefore, the display unit 160 may be tilted towards either the right or left side. Therefore, the display unit 160 may be tilted towards the driver even though the display unit 160 is located closer to the passenger, i.e., the pivotable rod 176 is pointed towards the passenger on the front seat. Similarly, the display unit 160 may be tilted towards the passenger on the front seat even the display unit 160 is located closer to the driver, i.e., the pivotable rod 176 is pointed towards the driver. Examples of fasteners have been provided earlier.

Referring now to FIG. 5, a block diagram 500 is presented for a system for presenting visual information in an automobile, in accordance with embodiments of the present invention. In the embodiment presented in FIG. 5, the receiving station 140 is placed on a flat tapered raised platform 178. The surface area of the flat tapered raised platform 178 may be greater than or equal to the surface area of the receiving station 140 and/or the mobile device 150. In some embodiments, the flat tapered raised platform 178 is built into the receiving station 140. In some embodiments, the flat tapered raised platform 178 is built into the dashboard 120 of the automobile. In some embodiments, the tapering angle of the platform 178 may be altered and the height of the platform 178 may be altered by a user of the system. Both quantities may be altered independently of each other. These alterations allow a driver or passenger to position the receiving station 140 and/or the mobile device 150 so that a desired portion of the mobile device 150 display is reflected by the display unit 160 (in embodiments where the display unit 160 is a mirror). Therefore, in some embodiments, a driver or passenger can modify characteristics of both the platform 178 and the display unit 160 in order to achieve an image of a desired portion of the mobile device 150 display on the display unit 160. For example, the platform may include a mechanical mechanism (e.g., using springs) that allows the tapering angle to be altered and/or the height of the platform 178 to be altered. Additionally or alternatively, the platform 178 may include an electronic mechanism that controls the tapering angle and the height of the platform 178. In some embodiments, the driver or passenger may adjust the tapering angle using one or more physical (e.g., physical buttons) or electronic (e.g., digital buttons/selection options) controls. In some embodiments, these controls may be present on the platform 178. In other embodiments, these controls may be on the dashboard 120 or the central console of the automobile and may allow a driver or passenger to adjust the tapering angle of the platform 178 and the height of the platform 178. In still other embodiments, the controls may be present on a remote control device associated with the system. In other embodiments, the user may adjust the properties using voice controls such that the platform 178 has the capability to receive and interpret the user's voice and perform one or more operations in response to the user's voice instructions. These operations may include adjusting the tapering angle of the flat tapered raised platform, adjusting the height of the flat tapered raised platform, etc.

Referring now to FIG. 6, a general process flow 600 is provided for presenting visual information in an automobile, in accordance with embodiments of the present invention. At block 610, a mobile device 150 is received at a receiving station 140 in an automobile. The mechanisms for receiving (and securing) the mobile device 150 at the receiving station 140 have been explained previously.

At block 620, the receiving station 140 may be configured. For instance, in embodiments where the display unit 160 is a mirror, the receiving station 140 may need to be appropriately positioned so that a desired portion of the mobile device 150 display is reflected by the display unit 160. As a further instance, in embodiments where the display unit 160 is an electronic display, the receiving unit may configure itself to receive output information from the mobile device 150 in response to one or more input instructions received at the mobile device 150. As a still further instance, in embodiments where the receiving station 140 functions as a charging station, the receiving station 140 may be used to charge the rechargeable power source located in the mobile device 150. As explained previously, this charging process may be triggered if the receiving station 140 determines that the amount of energy or power remaining in the rechargeable power source located in the mobile device 150 falls below a threshold level. As a still further instance, in embodiments where the receiving station 140 determines whether the display unit 160 is a mirror or an electronic display, the receiving station 140 makes this determination and communicates the result of this determination to the mobile device 150.

At block 630, a display unit 160 in the automobile may be configured such that information presented on the display unit 160 is viewable by a driver or a passenger in the automobile. As explained previously, in embodiments where the display unit 160 is a mirror, the display unit 160 may need to be positioned such that the display unit 160 is reflecting a desired portion of the mobile device 150 display. Additionally, in some embodiments, one or more controls (e.g., physical or electronic controls (e.g., physical or digital buttons or selection options) associated with the display unit 160 which may be located on the display unit 160, or elsewhere in the automobile, or on a remote control device associated with the display unit 160) may need to be used in order to configure the image on the display unit 160 so that the image does not appear to be inverted or reversed. In embodiments where the display unit 160 is an electronic display, a user may need to position (e.g., tilt sideways) the display unit 160 such that the user is able to view the information presented on the display unit 160. This may be essential in embodiments where the display unit 160 is an LCD display which has a limited angular viewing range.

At block 640, one or more input instructions may be received at the mobile device 150. As used herein, input instructions may be input by a user of the mobile device 150 but do not necessarily have to be input by a user of the mobile device 150. The input instructions may be received from a base station, another mobile device, the automobile in which the receiving station 140 is located, the receiving station 140, the display unit 160, a remote control device associated with the mobile device 150, etc. The input instructions may be of any form (e.g., voice input, signal input, touch input, etc.). In still other embodiments, the input instructions may be self-initiated by the mobile device 150 itself.

At block 650, output information (e.g., output visual information, output audio information, etc.) may be output from the display unit 160 in response to the one or more input instructions received at the mobile device 150.

In some embodiments, each step presented in FIG. 6 may serve as a triggering event for the next step. However, the steps of the method presented in FIG. 6 may be performed in an order different from that presented in FIG. 6.

Referring now to FIG. 7, FIG. 7 is a diagram illustrating a front view of exemplary external components of an exemplary device (e.g., the mobile device 150) that is received into a system for presenting visual information in an automobile. As illustrated, the mobile device 150 may include a housing 705, a microphone 710, a speaker 720, a keypad 730, function keys 740, a display 750, and a camera button 760. The terms device and component, as used herein, is intended to be broadly interpreted to include hardware, software, and/or a combination of hardware and software.

Housing 705 may include a structure configured to contain components of the mobile device 150. For example, housing 705 may be formed from plastic and may be configured to support microphone 710, speaker 720, keypad 730, function keys 740, display 750, and camera button 760.

Microphone 710 may include any component capable of transducing air pressure waves to a corresponding electrical signal. For example, a user may speak into microphone 710 during a telephone call. Speaker 720 may include any component capable of transducing an electrical signal to a corresponding sound wave. For example, a user may listen to music through speaker 720.

Keypad 730 may include any component capable of providing input to device 150. Keypad 730 may include a standard telephone keypad. Keypad 730 may also include one or more special purpose keys. In one implementation, each key of keypad 730 may be, for example, a pushbutton. A user may utilize keypad 730 for entering information, such as text or a phone number, or activating a special function.

Function keys 740 may include any component capable of providing input to device 150. Function keys 740 may include a key that permits a user to cause the mobile device 150 to perform one or more operations. The functionality associated with a key of function keys 740 may change depending on the mode of the mobile device 150. For example, function keys 740 may perform a variety of operations, such as placing a telephone call, playing various media, setting various camera features (e.g., focus, zoom, etc.) or accessing an application. Function keys 740 may include a key that provides a cursor function and a select function. In one implementation, each key of function keys 740 may be, for example, a pushbutton.

Display 750 may include any component capable of providing visual information. For example, in one implementation, display 750 may be a liquid crystal display (LCD). In another implementation, display 750 may be any one of other display technologies, such as a plasma display panel (PDP), a field emission display (FED), a thin film transistor (TFT) display, etc. Display 750 may be utilized to display, for example, text, image, and/or video information. Display 750 may also operate as a view finder, as will be described later. Camera button 760 may be a push-button that enables a user to take an image.

The mobile device 150 is exemplary; the mobile device 150 is intended to be broadly interpreted to include any type of electronic device. For example, the mobile device 150 may include a communication device, such as a wireless telephone or a personal digital assistant (PDA), a computational device, such as a computer, an entertainment device, such as a game system, a stationary device, such as a security system, or any other type of device that includes a display. For example, the mobile device 150 may be a navigation device, such as a global positioning system (GPS) device. Accordingly, although FIG. 7 illustrates exemplary external components of the mobile device 150, in other implementations, the mobile device 150 may contain fewer, different, or additional external components than the external components depicted in FIG. 7. Additionally, or alternatively, one or more external components of the mobile device 150 may include the capabilities of one or more other external components of the mobile device 150. For example, display 750 may be an input component (e.g., a touch screen). Additionally, or alternatively, the external components may be arranged differently than the external components depicted in FIG. 7.

In other instances, a user may access a function or service via a network (e.g., the Internet, a private network, a wireless network, a television network, etc.). For example, a user may visit a Web server to gain access to a credit card account, a banking account, an e-mail account, a video rental service account, etc. Accordingly, the concept described herein may be applied to various platforms and schemes.

FIG. 8 is a diagram illustrating a rear view of exemplary external components of the mobile device 150 depicted in FIG. 7. As illustrated, in addition to the components previously described, the mobile device 150 may include a camera 870, a lens assembly 872, and a flash 874.

Camera 870 may include any component capable of capturing an image. Camera 870 may be a digital camera. Display 750 may operate as a view finder when a user of the mobile device 150 operates camera 870. Camera 870 may provide for automatic and/or manual adjustment of a camera setting. In one implementation, the mobile device 150 may include camera software that is displayable on display 750 to allow a user to adjust a camera setting. For example, a user may be able adjust a camera setting by operating function keys 740.

Lens assembly 872 may include any component capable of manipulating light so that an image may be captured. Lens assembly 872 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. In one implementation, lens assembly 872 may be permanently fixed to camera 870. Lens assembly 872 may provide for a variable aperture size (e.g., adjustable f-number).

Flash 874 may include any type of light-emitting component to provide illumination when camera 870 captures an image. For example, flash 874 may be a light-emitting diode (LED) flash (e.g., white LED) or a xenon flash.

Although FIG. 8 illustrates exemplary external components, in other implementations, the mobile device 150 may include fewer, additional, and/or different components than the exemplary external components depicted in FIG. 8. For example, the mobile device 150 may not include camera 870 and other components associated therewith. In still other implementations, one or more external components of the mobile device 150 may be arranged differently.

FIG. 9 is a diagram illustrating exemplary internal components of the mobile device 150 depicted in FIG. 7. As illustrated, the mobile device 150 may include microphone 710, speaker 720, keypad 730, function keys 740, display 750, camera button 760, camera 870, a memory 900, a transceiver 920, and a control unit 930. No further description of microphone 710, speaker 720, keypad 730, function keys 740, display 750, camera button 760, and camera 870 is provided with respect to FIG. 7.

Memory 900 may include any type of storing component to store data and instructions related to the operation and use of the mobile device 150. For example, memory 900 may include a memory component, such as a random access memory (RAM), a read only memory (ROM), and/or a programmable read only memory (PROM). Additionally, memory 900 may include a storage component, such as a magnetic storage component (e.g., a hard drive) or other type of computer readable medium. Memory 900 may also include an external storing component, such as a Universal Serial Bus (USB) memory stick, a digital camera memory card, and/or a Subscriber Identity Module (SIM) card.

Memory 900 may include a code component 910 that includes instructions to perform one or more functions. For example, the code component 910 recognizes that the mobile device 150 has been received at a receiving station 140. As a further example, in response to the code component 910 determining that the display unit 160 is a mirror and not an electronic display, the code component 910 may cause the display 750 of the mobile device 150 to be configured appropriately such that when a user of the system views the display 750 via the display unit 160, the user views an image on the display unit 160 that is viewable, i.e., an image that is not reversed or inverted about a line of axis of the image. As a further example, the code component 910 recognizes that the mobile device 150 has been received at the receiving station 140 and turns off the display 750 in response to the mobile device 150 (e.g., code component 910 of the mobile device 150) determining that the display unit 160 is an electronic display. As a further example, the code component 910 recognizes that the mobile device 150 has been received at the receiving station 140 and turns off the display 750 in response to the mobile device 150 (e.g., code component 910 of the mobile device 150) determining that the display unit 160 is displaying visual output information in response to input instructions received at the mobile device 150, regardless of whether the display unit 160 is a mirror or an electronic display. Additionally, in response to the code component 910 determining that the display unit 160 is an electronic display, the code component 910 may cause the mobile device 150 to transmit (e.g., using the transceiver 920) one or more communication signals to the electronic display. The one or more communication signals carry output visual information (and/or output audio information) to be output at the display unit 160. As a further example, in response to the code component 910 determining that the mobile device 150 has been received at the receiving station 140, the code component 910 may forward the output visual and/or audio information to the receiving station 140, with instructions to the receiving station 140 to forward the output information to the display unit 160. In some embodiments, the receiving station 140, rather than the mobile device 150, determines whether the display unit 160 is a mirror or an electronic display, and forwards this information to the mobile device 150. Code component 910 may include instructions to cause mobile device 150 to provide other functionality other than as described herein. Any functions that are described as being performed by the mobile device 150 may be understood as being performed by the code component 910.

Transceiver 920 may include any component capable of transmitting and receiving information. For example, transceiver 920 may include a radio circuit that provides wireless communication with a network or another device.

Control unit 930 may include any logic that may interpret and execute instructions, and may control the overall operation of the mobile device 150. Logic, as used herein, may include hardware, software, and/or a combination of hardware and software. Control unit 930 may include, for example, a general-purpose processor, a microprocessor, a data processor, a co-processor, and/or a network processor. Control unit 930 may access instructions from memory 900, from other components of the mobile device 150, and/or from a source external to the mobile device 150 (e.g., a network or another device).

Control unit 930 may provide for different operational modes associated with the mobile device 150. Additionally, control unit 930 may operate in multiple modes simultaneously. For example, control unit 930 may operate in a camera mode, a walkman mode, and/or a telephone mode. In one implementation, a user may prevent access of the mobile device 150 by employing a security code.

Although FIG. 9 illustrates exemplary internal components, in other implementations, the mobile device 150 may include fewer, additional, and/or different components than the exemplary internal components depicted in FIG. 9. For example, in one implementation, the mobile device 150 may not include transceiver 920. In still other implementations, one or more internal components of the mobile device 150 may include the capabilities of one or more other components of the mobile device 150. For example, transceiver 920 and/or control unit 930 may include their own on-board memory 900.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for presenting visual information in an automobile, the system comprising:
   a receiving station that receives a mobile communication device; and a display unit that presents, to a driver or a passenger in the automobile, visual information in response to one or more input instructions received at the mobile communication device, wherein the display unit is separate from the mobile communication device's display, wherein the receiving station is connected to the display unit via a hinge, wherein the hinge permits rotation of the display unit with respect to the receiving station such that the display unit can fold over and rest on the receiving station.

2. The system of claim 1, wherein the receiving station charges a rechargeable power source located in the mobile communication device.

3. The system of claim 1, wherein the display unit is a convex mirror, wherein the mobile communication device's display presents visual information in response to the one or more input instructions received at the mobile communication device, wherein the display unit and the receiving station are positioned such that the display unit reflects at least a portion of the mobile communication device's display.

4. The system of claim 1, wherein the receiving station has the ability to receive mobile communication devices of a plurality of types.

5. The system of claim 1, wherein the receiving station automatically determines a model and manufacturer associated with the mobile communication device, and wherein the receiving station automatically configures itself to receive output information from the mobile communication device in response to the one or more input instructions received at the mobile communication device.

6. The system of claim 1, wherein the display unit is an electronic display.

7. The system of claim 1, wherein the display unit has audio output capability such that the display unit, instead of the mobile communication device, outputs audio signals in response to one or more triggering events detected at the mobile communication device.

8. The system of claim 1, wherein the receiving station receives output information from the mobile communication device in response to the one or more input instructions received at the mobile communication device, wherein the display unit is separate from the receiving station and receives one or more communication signals from the receiving station, and wherein the one or more communication signals carry the output information to be presented on the display unit.

9. The system of claim 1, wherein the receiving station is electronically connected to the mobile communication device.

10. The system of claim 1, wherein the receiving station is magnetically connected to the mobile communication device.

11. The system of claim 1, wherein the receiving station is positioned substantially horizontally with respect to the plane of the automobile, and wherein the display unit is positioned substantially vertically with respect to the plane of the automobile.

12. The system of claim 1, wherein the display unit is secured to the automobile such that the display unit allows a driver or a passenger in the automobile to view the visual information presented on the display unit while the automobile is in motion.

13. The system of claim 1, wherein the visual information is not presented on the mobile communication device's display when the visual information is presented on the display unit.

14. A method for presenting visual information in an automobile, the method comprising:

receiving a mobile communication device at a receiving station in an automobile;

positioning a display unit in the automobile such that information presented on the display unit is viewable by a driver or a passenger in the automobile;

receiving one or more input instructions at the mobile communication device; and presenting visual information on the display unit in response to the one or more input instructions received at the mobile communication device, wherein the display unit is separate from the mobile communication device's display, wherein the receiving station is connected to the display unit via a hinge, and wherein the hinge permits rotation of the display unit with respect to the receiving station such that the display unit can fold over and rest on the receiving station.

15. The method of claim 14, further comprising:

charging a rechargeable power source located in the mobile communication device when the mobile communication device is received at the receiving station.

16. The method of claim 14, wherein the display unit is a mirror, wherein the mobile communication device's display presents visual information in response to the one or more input instructions received at the mobile communication device, and wherein the presenting further comprises: reflecting, by the display unit, at least a portion of the mobile communication device's display.

17. The system of claim 14, wherein the receiving station has the ability to receive mobile communication devices of a plurality of types.

18. The method of claim 14, wherein the display unit is an electronic display, and wherein the method further comprises:

receiving, at the receiving station, output information from the mobile communication device in response to the one or more input instructions received at the mobile communication device; and sending, to the display unit from the receiving station, one or more communication signals carrying the output information to be presented on the display unit.

\* \* \* \* \*